(12) United States Patent
Hasegawa et al.

(10) Patent No.: US 7,703,274 B2
(45) Date of Patent: Apr. 27, 2010

(54) PINTLE INJECTOR

(75) Inventors: Keiichi Hasegawa, Kakuda (JP);
Shinichi Moriya, Kakuda (JP)

(73) Assignee: Japan Aerospace Exploration Agency, Tokyo (JP)

( * ) Notice: Subject to any disclaimer, the term of this patent is extended or adjusted under 35 U.S.C. 154(b) by 675 days.

(21) Appl. No.: 11/403,830

(22) Filed: Apr. 14, 2006

(65) Prior Publication Data

US 2006/0230745 A1    Oct. 19, 2006

(30) Foreign Application Priority Data

Apr. 18, 2005    (JP)    ............... 2005-119190

(51) Int. Cl.
*F02K 9/52* (2006.01)
*F02K 9/64* (2006.01)
(52) U.S. Cl. .................... 60/258; 60/267; 239/424
(58) Field of Classification Search .............. 60/257, 60/258, 267, 915; 239/424, 426
See application file for complete search history.

(56) References Cited

U.S. PATENT DOCUMENTS

| 2,555,085 | A | * | 5/1951 | Goddard | ................. | 60/258 |
| 2,943,442 | A | * | 7/1960 | Baehr | ................. | 60/258 |
| 3,040,521 | A | * | 6/1962 | Broughton et al. | ................. | 60/257 |
| 3,190,070 | A | * | 6/1965 | Neu, Jr. | ................. | 60/267 |
| 3,192,714 | A | * | 7/1965 | Hickerson | ................. | 60/230 |
| 3,383,862 | A | * | 5/1968 | Novotny | ................. | 60/258 |
| 3,515,353 | A | * | 6/1970 | Potocnik et al. | ................. | 239/414 |
| 3,699,772 | A |   | 10/1972 | Elverum, Jr. | | |
| 5,101,623 | A | * | 4/1992 | Briley | ................. | 60/251 |
| 6,185,927 | B1 |   | 2/2001 | Chrones et al. | | |
| 6,591,603 | B2 |   | 7/2003 | Dressler et al. | | |

FOREIGN PATENT DOCUMENTS

JP    2005-61385    3/2005

* cited by examiner

*Primary Examiner*—Ted Kim
(74) *Attorney, Agent, or Firm*—Westerman, Hattori, Daniels & Adrian, LLP

(57) ABSTRACT

To provide a simple structured and low cost pintle injector capable of uniformly atomizing and mixing fuel and oxidizer, and further improving the combustion efficiency of the combustion reaction in the combustion chamber. A pintle injector part having a first propellant channel forms a first injector flow path as a regenerative cooling path along the pintle external wall that projects into a combustion chamber, and high temperature fuel gas is injected from the first pintle injector port. On the other hand, an axial injector part is located upstream of the first pintle injector port, and injects comparatively low temperature liquid or gas fuel from an axial injector port via a third propellant channel and a third injector flow path. Oxidizer is injected from a second pintle injector port via a second propellant channel and a second injector flow path, and is atomized and mixed while being impinged on either by the high temperature fuel gas and the comparatively low temperature liquid or gas fuel. The fuel injected from the first pintle injector port and the fuel injected from the axial injector port may be the same type or a different type of fuel.

9 Claims, 7 Drawing Sheets

PINTLE INJECTOR

BACKGROUND OF THE INVENTION

1. Field of the Invention

The present invention relates to a pintle injector, and more particularly to a pintle injector with a simple structure and low cost that uniformly atomizes and mixes fuel and oxidizer that can contribute to further improvements in the combustion efficiency of the combustion reaction in a combustion chamber.

2. Description of the Related Art

Liquid rockets have a more complex structure compared with solid rockets. However, they have advantages such as suitability for large scale, thrust can be easily controlled, and so on. Therefore they are widely used in the main propulsion system of rockets for space transportation, or in the gas jet devices for orbiter maneuvering system or reaction control system of artificial satellites.

Liquid rockets are classified according to the propellant into monopropellant propulsion systems and bipropellant propulsion systems. In monopropellant propulsion systems the propellant undergoes a self decomposition reaction aided by a catalyst, and generates high temperature and high pressure combustion gas, and thrust is generated by ejecting the gas from a nozzle. In bipropellant propulsion systems, a fuel is provided for combustion reaction with an oxidizer in a combustion chamber to generate high temperature and high pressure combustion gases, and thrust is generated by ejecting the combustion gas from a nozzle. Generally the thrust F is expressed as the product of the combustion $P_c$, the area of the nozzle throat $A_1$, and a propulsion coefficient $C_F$ determined by the nozzle shape and other factors. Therefore, for both monopropellant and bipropellant propulsion systems, the combustion efficiency in the combustion chamber of either monopropellant or bipropellant rockets is one of the very important factors from the point of view of obtaining the required combustion pressure $P_c$.

Therefore for bipropellant propulsion systems it is a requirement for injectors that supply propellant to the combustion chamber that fuel and oxidant is atomized, mixed, and burned without the occurrence of combustion vibrations, combustion spikes, localized melting, or other anomalous combustion. Conventionally, the so-called coaxial type injector is known, in which on a injector surface plate many coaxial injector elements are located concentrically, and fuel is injected around and parallel to the oxidant (for example, Japanese Patent Application Laid-open No. 2005-61385).

Also, the so-called impinging type pintle injector is known, in which part of the propellant channel for the fuel or the oxidizer projects into the combustion chamber, and fuel or oxidizer is injected from the pintle, and the fuel and oxidizer stream are made to impinge each other (see for example, U.S. Pat. Nos. 3,699,772, 6,185,927, 6,591,603).

In the coaxial type injector disclosed in Japanese Patent Application Laid-open No. 2005-61385, combustion mainly occurs near the surface of the injector. Therefore combustion of the fuel and oxidizer can occur before the fuel and oxidizer have been uniformly atomized and mixed. This could result in combustion vibrations, combustion spikes, or other abnormal combustion, and lowering of combustion efficiency.

On the other hand, in the pintle injectors disclosed in U.S. Pat. Nos. 3,699,772, 6,185,927, and 6,591,603, part of the propellant channel projects into the combustion chamber, and either the fuel or oxidizer propellant is injected radially, and the other propellant is injected axially. It has the advantages that mixing is improved because the angle of intersection of the fuel stream and the oxidizer stream is about 90° and manufacturing cost can be reduced drastically by the simple structure compared to the coaxial type injectors.

However, in case of using the above pintle injectors the combustion efficiency was reported at best 90~95%, and the problem is that it is difficult to improve this combustion efficiency to the further level.

SUMMARY OF THE INVENTION

With the foregoing problem points of the related art in view, it is an object of the present invention to provide a simple structure and low cost pintle injector capable of uniformly atomizing and mixing fuel and oxidizer and further improving the combustion efficiency.

To achieve the above object, the pintle injector according to claim 1 includes a pintle injector part which projects into a combustion chamber and which has a propellant channel that transmits fuel or oxidizer propellant for injecting propellant, wherein the pintle injector part comprises on the outer peripheral surface thereof a first pintle injector port that injects the propellant and a second pintle injector port, and a first injector flow path, upstream of the first pintle injector port, is formed as a regenerative cooling path along the outer wall of the pintle injector part.

In the above pintle injector, the first injector flow path of the first pintle injector port is formed as a regenerative cooling path. Therefore, the propellant can obtain the gasification heat equivalent to the latent heat and sensible heat from the combustion chamber, to become a high temperature gas and be injected from the first injection port. As a result, high temperature propellant gas is injected from the first pintle injector port. On the other hand, comparatively low temperature liquid or gas propellant is injected from the second pintle injector port. In this way, high temperature gas propellant and low temperature liquid or gas propellant, in other words the same or different type of propellant with differing temperatures, states, and properties are generated. The fuel and the oxidizer are mixed based upon these, so atomization and mixing of the fuel and oxidizer is promoted further.

In the pintle injector according to claim 2, each of the first pintle injector port and the second pintle injector port includes a group of annular orifices or annular slits.

In the above pintle injector, the propellants injected from the first pintle injector ports and the second pintle injector ports are uniformly atomized and mixed, so atomization and mixing of propellants are promoted further.

In the pintle injector according to claim 3, propellant of a single or two or more types of fuel, or oxidizer, injected in the axial direction from an axial injector port, the same or different propellant injected from the first pintle injector port in the radial direction, and the same or a different propellant injected from the second pintle injector, are mixed so that mixing of fuel and oxidizer are improved.

In the above pintle injector, fuel and oxidizer are mixed while impinging in the axial direction and the radial direction. Therefore, atomization and mixing of fuel and oxidizer is promoted. Also, the oxidizer can be mixed with two or more types of fuel, for example, hydrogen and methane.

In the pintle injector according to claim 4, a propellant of either fuel or oxidizer, injected from the second pintle injector port is mixed with another propellant injected from the first pintle injector port and another propellant injected from the axial injector port while being sandwiched and impinged on by them.

In the above pintle injector, a single propellant is mixed while being impinged on both sides by the same or different types of propellant whose temperatures and states differ. Therefore atomization and mixing of fuel and oxidizer is promoted.

In the pintle injector according to claim 5, the first injector flow path, a second flow path upstream of the second pintle injector port, and a third injector flow path upstream of the axial injector port are formed at an incline to the axial or radial directions.

In the above pintle injector, the first injector flow path is inclined, so the injector flow of propellant injected from the first pintle injector port has a component of velocity in the circumferential direction as well as a component of velocity in the radial direction. On the other hand, the second injector flow path is inclined, so the injector flow of propellant injected from the second pintle injector port has a component of velocity in the circumferential direction as well as a component of velocity in the radial direction. In the same way, the injection flow of propellant injected from the axial injector port has a component of velocity in the circumferential direction as well as a component of velocity in the axial direction. Therefore, fuel and oxidizer are mixed in the axial, radial, and circumferential directions. As a result, atomization and mixing of fuel and oxidizer is promoted.

In the pintle injector according to claim 6, the first injector flow path, the second injector flow path, and the third injector flow path are arranged so that the injected flow of propellant from the axial injector port, and the injected flow of propellant from the first pintle injector port or the injected flow of propellant from the second pintle injector port are mixed while being collided with each other.

In the above pintle injector, atomization and mixing of fuel and oxidizer is promoted.

In the pintle injector according to claim 7, if at least one of the first pintle injector port, the second pintle injector port, or the axial injector port comprises a group of annular orifice holes, female screw threads or spiral grooves are formed in the internal peripheral surfaces of the orifices.

In the above pintle injector, propellant injected from the orifice holes is formed into a spiraling flow, so atomization and mixing of fuel and oxidizer is promoted.

According to the pintle injector of the present invention, the first injector flow path of the first pintle injector port is formed as a regenerative cooling path. Therefore, the propellant can obtain the gasification heat equivalent to the latent heat and sensible heat from the combustion chamber, to become a high temperature gas and be injected from the first injection port. As a result, high temperature propellant gas is injected from the first pintle injector port. On the other hand, comparatively low temperature liquid or gas propellant is injected from the second pintle injector port. In this way, high temperature gas propellant and low temperature liquid or gas propellant, in other words the same or different type of propellant with differing temperatures, states, and properties are generated. The fuel and the oxidizer are mixed based upon these, so atomization and mixing of the fuel and oxidizer is promoted. In particular, when fuel and oxidizer are mixed such as high temperature propellant gas and low temperature liquid or gas propellant are impinging on either side of another propellant, propellant atomization and mixing is further promoted. Also, when the first pintle injector port and the second pintle injector port are formed as a row of annular orifice holes or annular slits, the propellants injected from both the first pintle injector port and the second pintle injector port are uniformly atomized and dispersed, so atomization and mixing of propellant is promoted.

Furthermore, a single or two or more types of propellant, either fuel or oxidizer, injected in the axial direction from an axial injector port, the same or a different propellant injected from the first pintle injector port in the radial direction, and the same or a different propellant injected from the second pintle injector port are mixed so that fuel and oxidizer are mixed. Therefore, oxidizer can be mixed with two or more types of fuel, and as a result atomization and mixing of fuel and oxidizer is promoted. In particular, when the first injector flow path, the second injector flow path, and the third injector flow path are formed at an incline to the axial or radial directions, fuel and oxidizer are mixed in the axial direction, radial direction, and circumferential direction, so atomization and mixing of fuel and oxidizer is promoted further. Also, if the first injector flow path, the second injector flow path, and the third injector flow path are arranged so that the injector flow of propellant injected from the axial injector port, and the injector flow of propellant injected from the first pintle injector port or the injector flow of propellant injected from the second pintle injector port mix while impinging, atomization and mixing of fuel and oxidizer is promoted. Or, if at least one of the first pintle injector port, the second pintle injector port, and the axial injector port includes a group of annular orifice holes, and if female screw threads or spiral grooves are formed in the internal surfaces of the orifices, propellant injected from the orifice holes is formed into a spiraling flow, so atomization and mixing of fuel and oxidizer is promoted further. Therefore, with the pintle injector of the present invention, fuel and oxidizer is uniformly atomized and mixed in the combustion chamber. Therefore combustion in the combustion chamber is stable, and as a result the combustion efficiency can be significantly improved.

DESCRIPTION OF THE PREFERRED EMBODIMENTS

Figure 1:
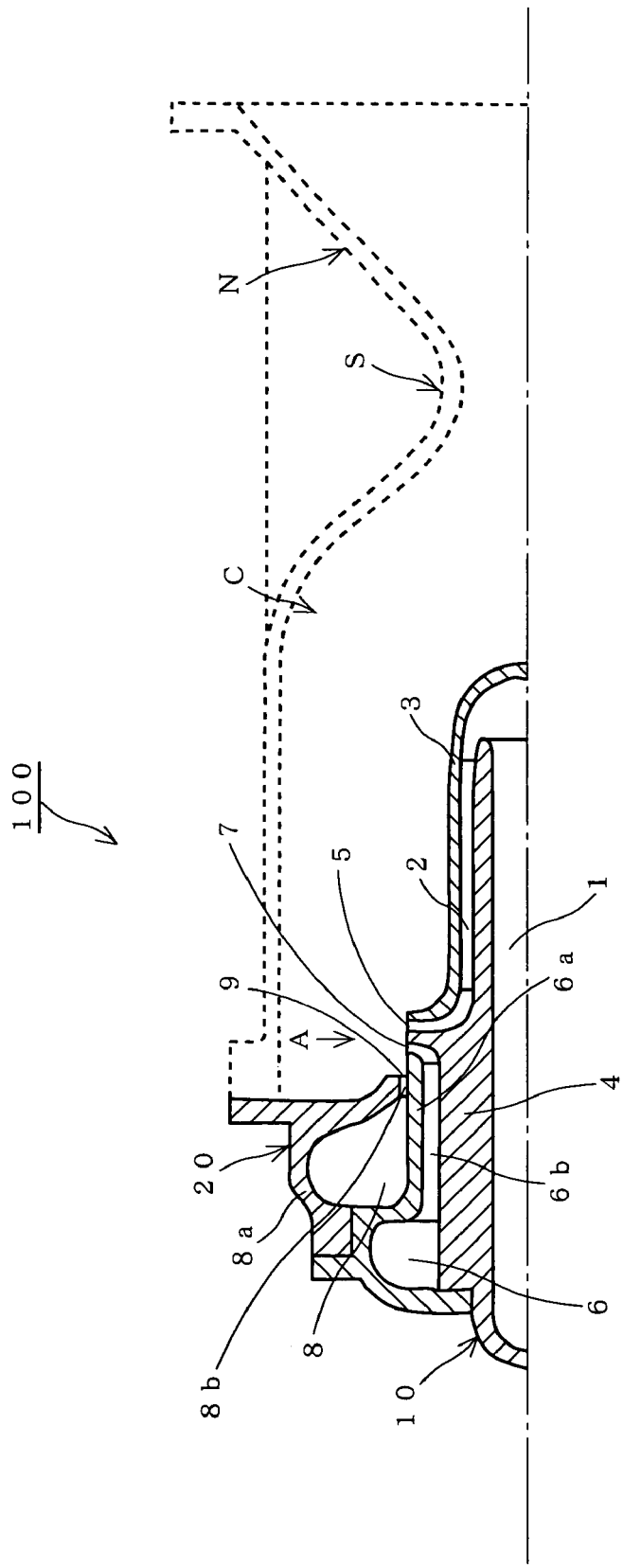
FIG. 1 is a cross-section showing a pintle injector according to a first embodiment of the present invention.

The following is a detailed explanation of the preferred embodiments shown in the drawings.

Embodiment 1

FIG. 1 is a cross-section showing a pintle injector 100 according to a first embodiment of the pintle injector of the present invention.

The pintle injector 100 includes a pintle injector part 10 and an axial injector part 20. The pintle injector part 10 includes a first propellant channel 1 that transmits fuel and a second propellant channel 6 that transmits oxidizer. The first propellant channel 1 projects into a combustion chamber C, and fuel is injected in the radial direction from a first pintle injector port 5. Oxidizer is injected from a second pintle injector port 7 in the radial direction. The axial injector part 20 includes a third propellant channel 8 that transmits fuel, and fuel is injected in the axial direction from an axial injector port 9.

Between a pintle external wall 3 and a pintle internal wall 4 of the pintle injector part 10, a plurality of first injector flow paths 2 is formed in a circle at equal intervals. Also, the shape of the first injector flow paths 2 is for example that of a tube or a rectangle. Fuel flowing in the first propellant channel 1 exchanges heat with the pintle external wall 3 while passing through the first injector flow paths 2. In other words, the fuel obtains from the pintle external wall 3 the latent heat equivalent to the heat of vaporization and sensible heat to become a high temperature gas. On the other hand, the pintle external wall 3 loses part of its sensible heat and is cooled. Therefore the first injector flow paths 2 function as regenerative cooling paths. Then the fuel that has become a high temperature gas is injected from the first pintle injector port 5 and mixes with oxidizer so mixing of fuel and oxidizer is promoted. In this way, the pintle injector part 10 has the plurality of first injector flow paths 2 that project into the combustion chamber as regenerative cooling paths. Therefore fuel cools the pintle external wall 3 in the combustion chamber C while the fuel itself is converted into high temperature gas. The high temperature gas is injected from the first pintle injection port 5 and mixed with the oxidizer, which contributes to improving the combustion efficiency as described later.

Figure 2:
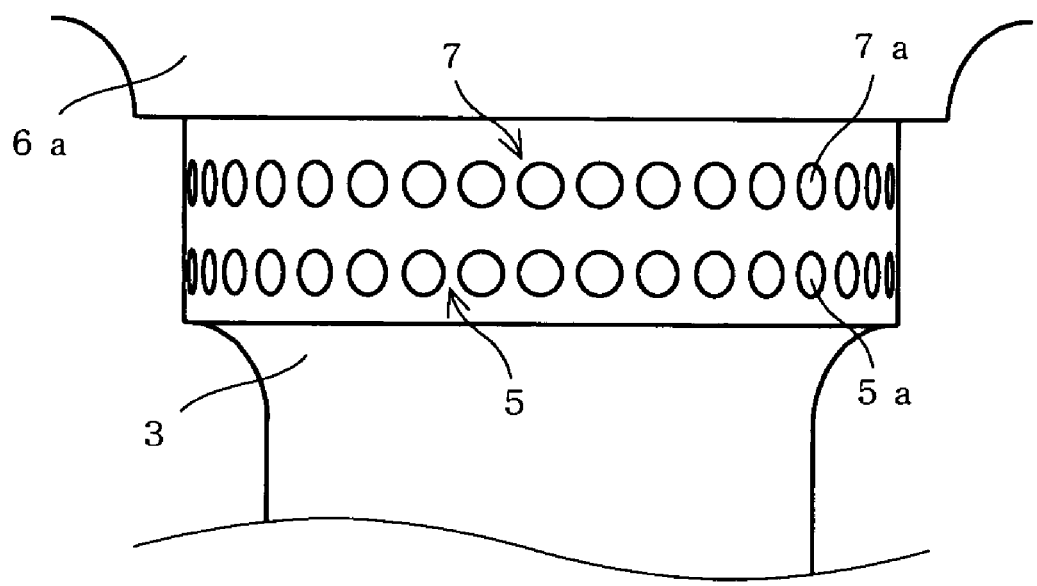
FIG. 2 is a view in the direction of the arrow A in FIG. 1.

Also, as shown in FIG. 2, the first pintle injector port 5 is an orifice group that includes a plurality of orifices 5a. The second injector port 7 is an orifice group that includes a plurality of orifices 7a. When gasified fuel passes through the orifice 5a it is uniformly atomized and mixing with the oxidizer is promoted. On the other hand, when the oxidizer passes through the orifice 7a, the oxidizer is atomized which promotes mixing with the fuel. The first pintle injector port 5 and the second pintle injector port 7 may be annular slits instead of rows of orifices.

In the axial injector part 20, the fuel flowing in the third propellant channel 8 passes through a third injector flow path 8b and is injected in the axial direction from the axial injector port 9. Also, the axial injector port 9 is formed from a second channel wall 6a and a third channel wall 8a into for example an annular slit.

According to the pintle injector 100, the injection flow of fuel injected from the first pintle injector port 5 is high temperature fuel gas. On the other hand, the injector flow of fuel injected from the axial injector port 9 is either liquid or gasified fuel at a comparatively low temperature. Therefore, the injection flow of oxidizer injected from the second pintle injector port 7 is impinged upon on both sides by and mixes with high temperature fuel gas on one side and low temperature fuel on the other side, or the same or different types of fuel at different temperatures and in different states. Furthermore, the injection direction of the first pintle injector port 5 and the injection direction of the axial injector port 9 are approximately at right angles to each other. Also the injection direction of the second pintle injector port 7 and the injection direction of the axial injector port 9 are approximately at right angles to each other. This promotes the atomization and mixing of the oxidizer with the low and high temperature fuel that are either the same or different types of fuel. As a result when the mixture of fuel and oxidizer is provided for combustion, the combustion is stable and the combustion efficiency improves significantly. The fuel injected from the first pintle injector port 5 and the fuel injected from the axial injector port 9 may be the same or a different type of fuel.

Also, in the pintle injector 100, the fuel is injected from the first pintle injector port 5 and the axial injector port 9, and the oxidizer is injected from the second pintle injector port 7 to be impinged upon on both sides by the fuel. However, the invention is not limited to this configuration. The oxidizer may be injected from the first pintle injector port 5 and the axial injector port 9, and the fuel injected from the second pintle injector port 7 to be impinged upon on both sides by the oxidizer.

Liquid hydrogen, hydrazine, or kerosene may be used as the fuel for example. On the other hand, liquid oxygen, dinitrogen tetraoxide, or hydrogen peroxide may be used as the oxidizer.

Embodiment 2

Figure 3:
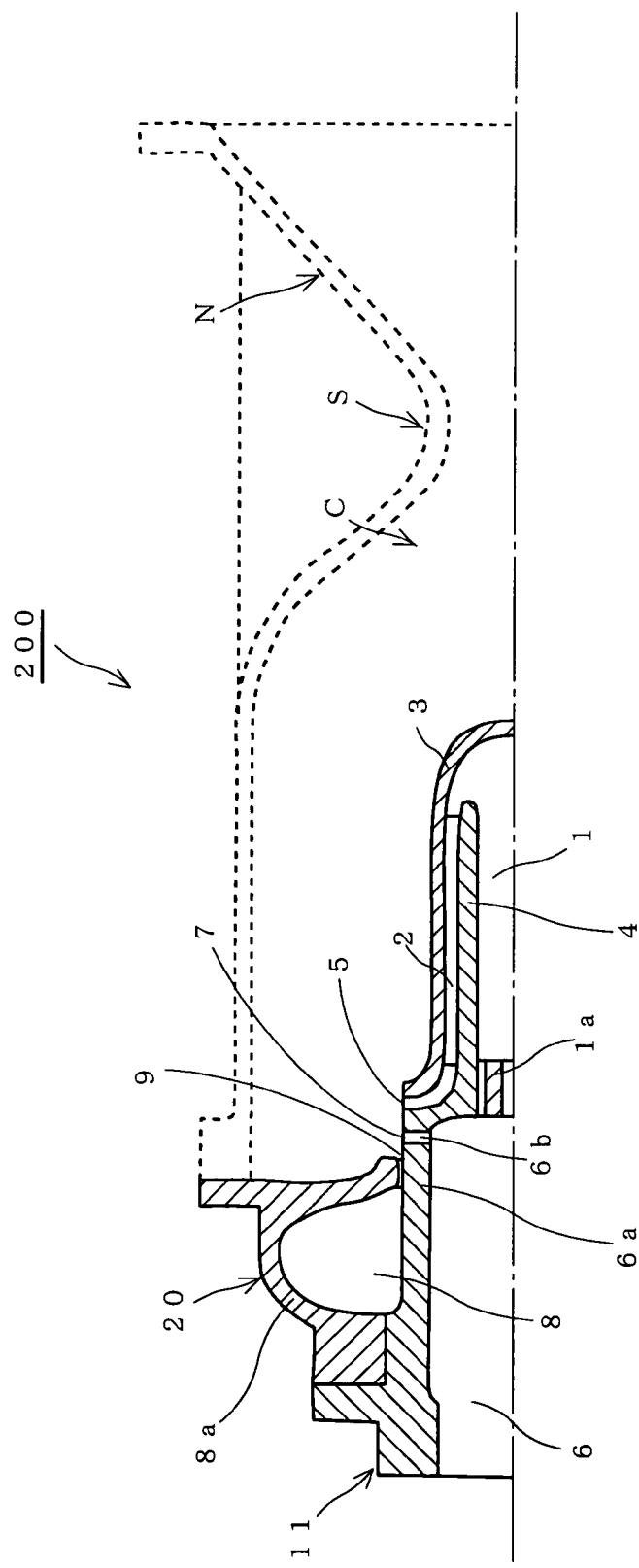
FIG. 3 is a cross-section showing a pintle injector according to a second embodiment of the present invention.

FIG. 3 is a cross-section showing a pintle injector 200 according to a second embodiment of the present invention.

The pintle injector 200 includes a pintle injector part 11 and an axial injector part 20. The pintle injector part 11 includes a first propellant channel 1 and a second propellant channel 6. The first propellant channel 1 projects into a combustion chamber C. Part of the oxidizer is injected from a first pintle injector port 5 in the radial direction, and the rest of the oxidizer is injected from a second pintle injector port 7 in the radial direction. The axial injector part 20 includes a third propellant channel 8 that transmits fuel, and injects fuel from an axial injector port 9 in the axial direction.

In the pintle injector 100 of the first embodiment, part of the fuel exchanges heat with the pintle external wall 3 and is gasified into a high temperature fuel gas and injected from the first pintle injector port 5. Together with the comparatively low temperature liquid fuel injected from the axial injector port 9, the high temperature fuel gas impinges on the oxidizer injected from the second pintle injector port 7 so that the fuel and oxidizer are mixed. However, in this embodiment part of the oxidizer exchanges heat with a pintle external wall 3 and is gasified into a high temperature oxidizer gas and injected from the first pintle injector port 5. The rest of the oxidizer that is at a comparatively low temperature and is injected from the second pintle injector port 7, and together with the high temperature oxidizer gas injected from the first pintle injector port 5 mixes with the fuel injected from the axial injector port 9.

In the pintle injector part 11, part of the oxidizer passes through the first propellant channel 1 and a plurality of first injector flow paths 2 via a flow rate adjustment orifice 1a, and is injected from the first pintle injector port 5 formed from a plurality of orifices 5a, similar to the first embodiment. The rest of the oxidizer passes through the second propellant channel 6 and the plurality of second injector flow paths 6b and is injected from the second pintle injector port 7 formed from a plurality of orifices 7a, similar to the first embodiment.

Part or all of the oxidizer injected from the first pintle injector port 5 is a gasified high temperature fluid. The oxidizer injected from the second pintle injector port 7 is comparatively low temperature liquid or gas. The fuel injected from the axial injector port 9 is low temperature liquid or gas. Furthermore, the direction of the oxidizer injected from the first pintle injector port 5 and the second pintle injector port 7 and the direction of the fuel injected from the axial injector port 9 intersect at an angle of approximately 90°. Therefore, atomization and mixing of the fuel and oxidizer is promoted.

According to the pintle injector 200, part or all of the injection flow of oxidizer injected from the first pintle injector port 5 is gasified high temperature oxidizer. On the other hand, the oxidizer stream injected from the second pintle injector port 7 is comparatively low temperature liquid or gas. Therefore, the fuel injected from the axial injector port 9 is mixed with high temperature oxidizer and low temperature oxidizer. Also, the direction of injection of first pintle injector port 5 and the direction of injection of the axial injector port 9 intersect at approximately right angles. Also, the direction of injection of the second pintle injector port 7 and the direction of injection of the axial injector port 9 intersect at approximately right angles. Furthermore, the first pintle injector port 5 and the second pintle injector port 7 are comprised of orifice rows including pluralities of orifices 5a, 7a, so the oxidizer is uniformly atomized. In this way atomization and mixing of the fuel and oxidizer is promoted, and the combustion stability and the combustion efficiency are improved significantly.

Third Embodiment

Figure 4:
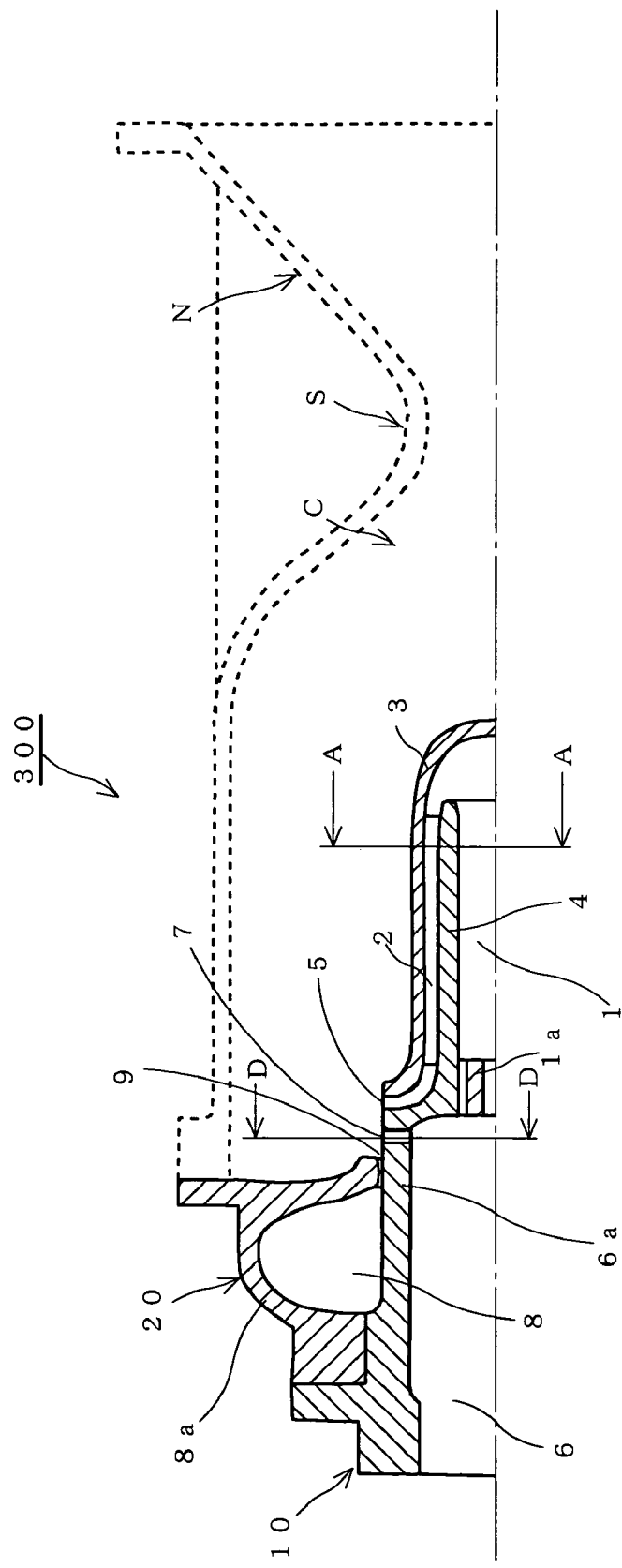
FIG. 4 a cross-section showing a pintle injector according to a third embodiment of the present invention.

FIG. 4 is a cross-section showing a pintle injector 300 according to a third embodiment of the present invention.

The details of the pintle injector 300 will be described later with reference to FIGS. 5 through 8. However, unlike the pintle injector 200 of the second embodiment, a plurality of first injector flow paths 2, a plurality of second injector flow paths 6b, and a plurality of third injector flow paths 8b are formed at an incline to the axial direction or the radial direction, so that the oxidizer and fuel injected from the first pintle injector port 5, the second pintle injector port 7, and the axial injector port 9 has a component of velocity in the circumferential direction.

Figure 5:
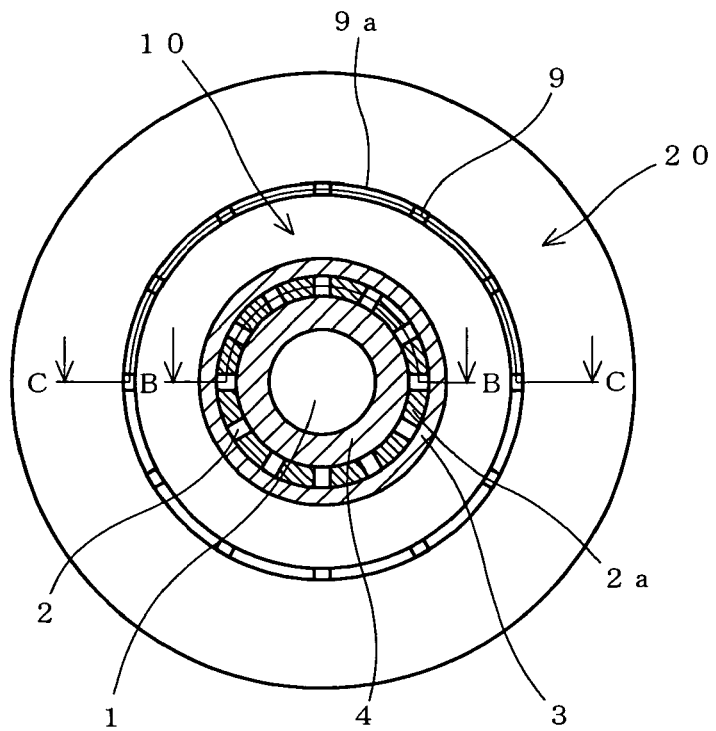
FIG. 5 is a view showing the cross-section A-A in FIG. 4.

FIG. 5 is a view showing the cross-section A-A in FIG. 4.

The first injector flow paths 2 are formed at equal intervals in a circular shape by a pintle outer wall 3, a pintle inner wall 4, and a plurality of flow path barrier walls 2a. Also, the axial injector ports 9 are formed at equal intervals in a circular shape by a pintle injector part 10, an axial injector port 20, and a plurality of flow path separation walls 9a. The first injector flow path 2 and the axial injector port 9 can be a circular or elliptical shape, besides a rectangular shape.

Figure 6:
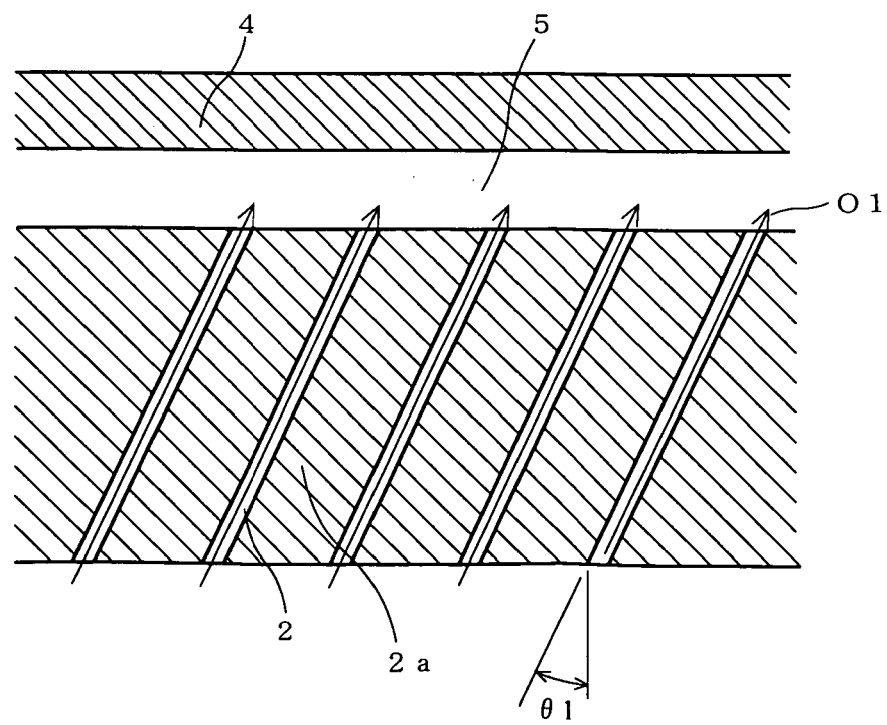
FIG. 6 is a view showing the cross-section B-B in FIG. 5.

FIG. 6 is a view showing the cross-section B-B in FIG. 5.

The flow path separation walls 2a are set at an inclination to the axial direction so that the oxidizer gas flow O1 injected from the first injector flow path 2 has a component of velocity in the circumferential direction. The inclination angle $\theta_1$ is, for example, 30°. Also, as shown in FIG. 7, the oxidizer gas flow O1 flowing from the first injector flow path 2 is injected from the first pintle injection port 5 while rotating, and impinged and mixed with at an intersection angle of about 90° the fuel flow F injected from the axial injector port 9.

Figure 7:
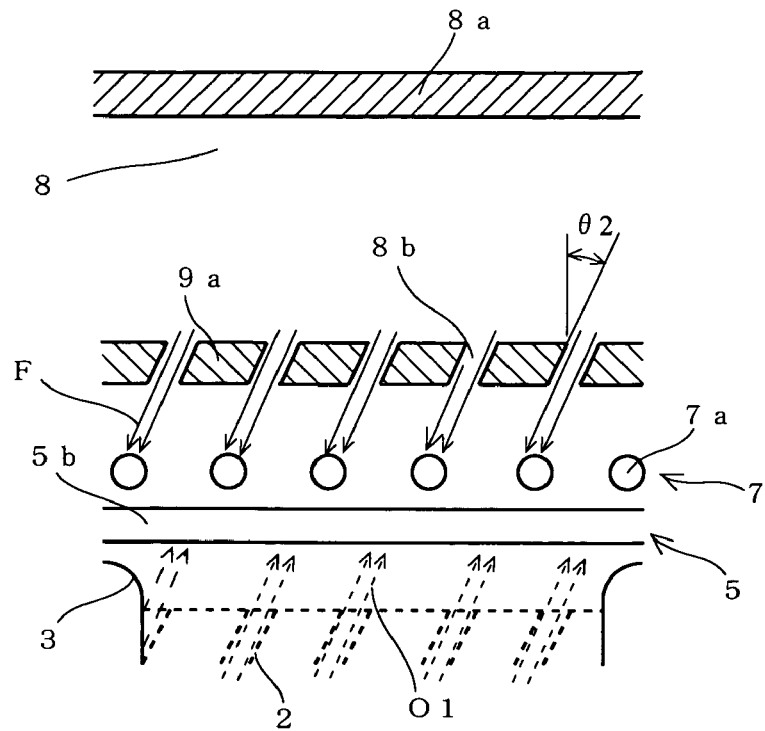
FIG. 7 is a view showing the cross-section C-C in FIG. 5.

FIG. 7 is a view showing the cross-section C-C in FIG. 5.

The third injector flow paths 8b are set inclined to the axial direction, so that the fuel flow F injected from the axial injector port 9 has a component of velocity in the circumferential direction. The inclination angle $\theta_2$ is, for example, 30°. Also, the first pintle injector port 5 is formed as an annular slit 5b, and the second pintle injector port 7 is a row of a plurality of orifices 7a. The fuel flow F injected from the axial injector port 9 has a component of velocity in the axial direction and a component of velocity in the circumferential direction. On the other hand, the oxidizer gas flow O1 injected from the first pintle injector port 5 has a component of velocity in the radial direction and a component of velocity in the circumferential direction. Therefore, the fuel and oxidizer mix in the axial direction, radial direction, and the circumferential direction. Furthermore, the first injector flow path 2, the orifices 7a, and the third injector flow path 8b are set appropriately so that the fuel flow F injected from the axial injector port 9, the high temperature oxidizer gas flow O1 injected from the first pintle injector port 5, and the comparatively low temperature liquid or gaseous oxidizer flow O2 injected from the second pintle injector port 7 are impinged each other. Therefore, mixing of the fuel and oxidizer is further promoted.

Figure 8:
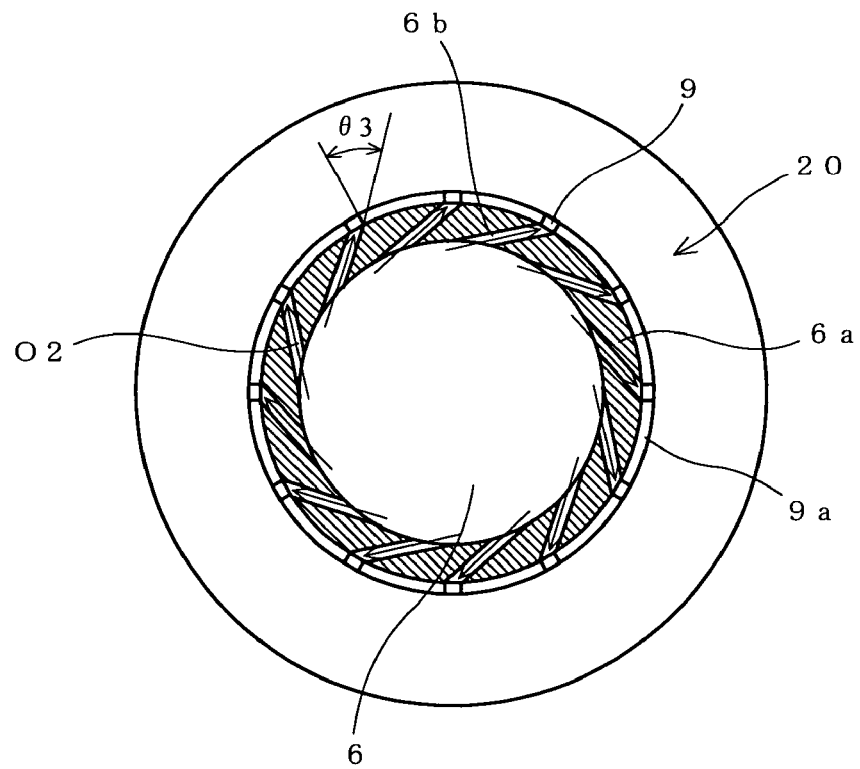
FIG. 8 is a view showing the cross-section D-D in FIG. 4.

FIG. 8 is a view showing the cross-section D-D in FIG. 4.

The second injector flow path 6b is formed at an incline to the radial direction, so that the oxidizer flow O2 injected from the second pintle injector port 7 has a component of velocity in the circumferential direction. The inclination angle $\theta_3$ is, for example, 45°. Furthermore, the second injector flow path 6b is arranged to correspond with the axial injector port 9, so that the oxidizer flow O2 impinges the fuel flow F injected from the axial injector port 9. In this way, the high temperature oxidizer gas flow O1 injected from the first pintle injector port 5, the comparatively low temperature liquid or gas oxidizer flow O2 injected from the second pintle injector port 7, and the fuel flow F injected from the axial injector port 9 mutually impinges and mix in the axial direction, the radial direction, and the circumferential direction. Therefore atomization and mixing of fuel and oxidizer is further promoted.

Fourth Embodiment

Figure 9:
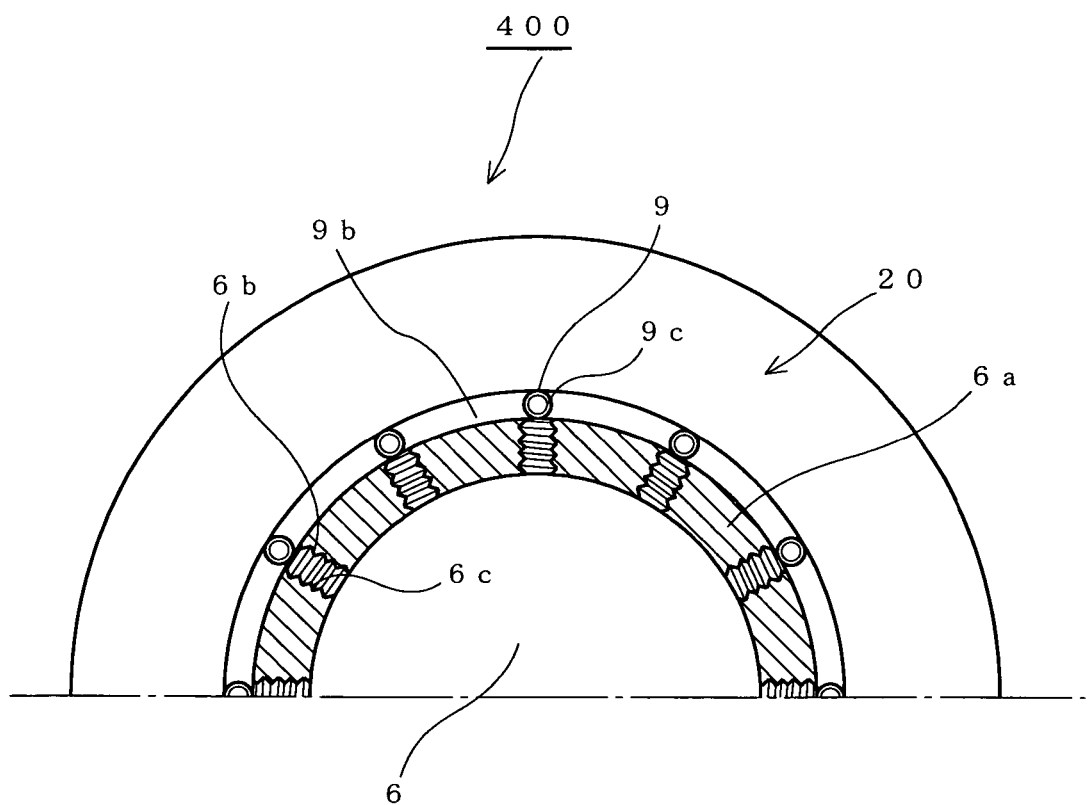
FIG. 9 is a cross-section showing a pintle injector according to a fourth embodiment of the present invention.

FIG. 9 is a cross-section showing a pintle injector 400 according to a fourth embodiment of the present invention.

This figure shows the location equivalent to section D-D in FIG. 4 in the pintle injector 400.

In the pintle injector 400, in order that all or part of the fuel and oxidizer injected from a first pintle injector port 5, a second pintle injector port 7, and an axial injector port 9 forms a spiraling flow, female screw or spiral grooves are formed in the internal surfaces of each orifice in the pintle injector 200 of the second embodiment. In FIG. 9, female screw threads 6c are formed in the internal surfaces of the orifices of for example the second pintle injector port 7, which corresponds to the second injector flow path 6b. Also, female screw threads 9c are formed on the internal peripheral surfaces of the orifices of the axial injector port 9, which corresponds to the third injector flow path 8b. In this way, by forming female screw threads or spiral grooves on the inside peripheral surfaces of all or part of the orifices, the high temperature oxidizer gas flow O1 injected from the first pintle injector port 5, the comparatively low temperature liquid or gas oxidizer flow O2 injected from the second pintle injector port 7, and the fuel flow F injected from the axial injector port 9 are impinged and mixed in the axial direction, the radial direction, and the circumferential direction as in the third embodiment. Therefore, atomization and mixing of fuel and oxidizer is further promoted.

INDUSTRIAL APPLICABILITY

The pintle injector of the present invention is suitable for application to injectors of rocket engines or apogee engines, or thruster injectors for reaction control system for rockets or satellites, as well as injectors for the internal combustion unit of gas turbines or boilers, etc.

We claim:

1. A pintle injector, having a pintle injector part, said pintle injecting part having propellant channels for transmitting fuel and oxidizer as propellants, said propellant channels project into a combustion chamber for injecting said propellants, comprising:

the pintle injector part includes on the outer peripheral surface thereof a first pintle injector port and a second pintle injector port injecting one of the propellants, said first pintle injector port having an injecting alignment of the radial direction, a flow reversing first injector flow path, upstream of the first pintle injector port, is formed as a regenerative cooling path having a plurality of first injector paths spaced at equal intervals between an outer wall and an internal wall of the pintle injector part, and an axial injector port, located upstream of the first pintle injector port, having injecting alignment of the axial direction, for injecting one of the propellants, wherein the propellants injected into the combustion chamber constitute at least one fuel propellant and one oxidizer propellant so that when the propellants injected into the combustion chamber from the axial injector port, the first pintle injector port and the second pintle injector port are mixed due to colliding and sandwiching with each other, the atomization of fuel and oxidizer are promoted, wherein the propellants injected into the combustion chamber having same temperatures, states and properties or different temperatures, states and properties or combination of same or different temperatures, states or properties.

2. The pintle injector according to claim 1, wherein each of the first pintle injector port and the second pintle injector port comprises a group of annular orifices or annular slits.

3. The pintle injector according to claim 1 or 2, wherein if at least one of the first pintle injector port, the second pintle injector port, or the axial injector port comprises a group of annular orifice holes, female screw threads or spiral grooves are formed in the internal peripheral surfaces of the orifices.

4. The pintle injector according to claim 1, wherein a propellant of either fuel or oxidizer, injected from the second pintle injector port is mixed with another propellant injected from the first pintle injector port and another propellant injected from the axial injector port while being sandwiched and impinged on by them.

5. The pintle injector according to claim 4, wherein the first injector flow path, a second injector flow path upstream of the second pintle injector port, and a third injector flow path upstream of the axial injector port are formed at an incline to the axial or radial directions.

6. The pintle injector according to claim 5, wherein the first injector flow path, the second injector flow path, and the third injector flow path are arranged so that the injector flow of propellant injected from the axial injector port, and the injector flow of propellant injected from the first pintle injector port, and the injector flow of propellant injected from the second pintle injector port mix while being collided with each other.

7. The pintle injector according to claim 6, wherein if at least one of the first pintle injector port, the second pintle injector port, or the axial injector port comprises a group of annular orifice holes, female screw threads or spiral grooves are formed in the internal peripheral surfaces of the orifices.

8. The pintle injector according to claim 5, wherein if at least one of the first pintle injector port, the second pintle injector port, or the axial injector port comprises a group of annular orifice holes, female screw threads or spiral grooves are formed in the internal peripheral surfaces of the orifices.

9. The pintle injector according to claim 4, wherein if at least one of the first pintle injector port, the second pintle injector port, or the axial injector port comprises a group of annular orifice holes, female screw threads or spiral grooves are formed in the internal peripheral surfaces of the orifices.

* * * * *